Aug. 7, 1956     ITSUO HANDA     2,757,456
MEASURING METER FOR A TAPE RECORDER
Filed Sept. 4, 1952
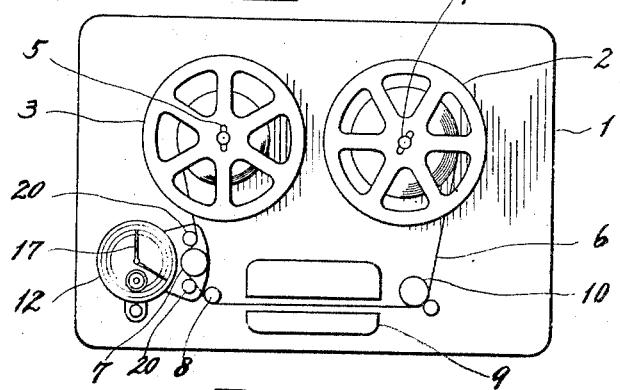
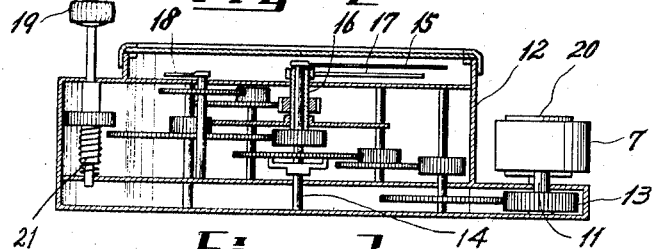
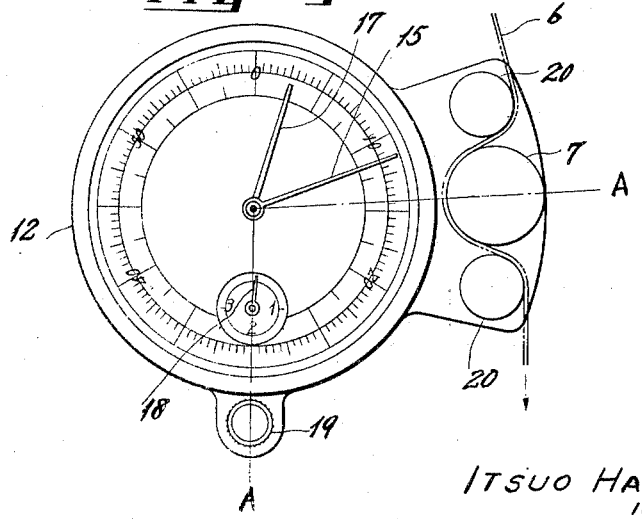
ITSUO HANDA
INVENTOR.
Albert M. Parker
ATTORNEY.

United States Patent Office 2,757,456
Patented Aug. 7, 1956

2,757,456

MEASURING METER FOR A TAPE RECORDER

Itsuo Handa, Kamigamo, Kamikyo-ku, Kyoto, Japan

Application September 4, 1952, Serial No. 307,821

3 Claims. (Cl. 33—129)

This invention relates to apparatus for indicating a particular section of tape used in a tape recorder.

Tape recorders of the type here being considered employ a winding reel, usually motor driven to rotate in a clockwise direction, and a re-winding reel, similarly driven to rotate counterclockwise. These reels are commonly fitted to separate shafts. The tape traveling from the re-winding reel to the winding reel passes through a head casing in which there is an erase-head, a record-head and a reproducing head. The tape, after passing through the head casing, is reeled up on a winding reel.

This invention is concerned with the provision of a measuring meter in such a recorder, which measuring meter is located in the path of the tape running from one of the reels to the other. The measuring meter employs a roller mounted for frictional engagement with the tape, to be driven thereby. The roller in turn drives a clock mechanism, which mechanism operates indicating hands or other indicating means. Commonly, a second hand is provided rotating once a minute, a minute hand advancing one graduation for a rotation of the second hand, and an hour hand advancing one graduation for a rotation of the minute hand. The invention is not necessarily limited, however, to such ratio of hands.

In a regular tape recorder, the reeling roller is rotated at such a speed as the tape is reeled 3¾"/sec. Therefore by means of this measuring meter, the time required for the tape to pass through the head-casing can directly be found out and indirectly the length of recorded tape reeled can be obtained. Of course when the tape is being rewound, the hands make reverse rotation. Therefore the length of the tape rewound can be obtained. Consequently, if a certain part of a long stretch of recorded tape is required to be reproduced, the apparatus must be allowed to work without setting the reproduce-mechanism in operation till the desired part is reached. The desired part can be obtained by reading the graduation on the dial.

If a speed of 7½"/sec. or 15"/sec. is required in recording according to the nature and kind of the sound, the reeling roller must be replaced with one whose diameter is fitted for the purpose. In the event the reeling roller is replaced with a roller whose diameter is twice or four times as large, one graduation will indicate ½ or ¼ second, minute and hour respectively.

An object of this invention is to provide in tape recording devices means for obtaining the length of the tape advanced from a reading on a dial.

Another object is to provide from such reading for the time required for recording and reproducing.

A further object is to provide for an indication showing the exact location of a recorded section of tape.

The preferred embodiment of this invenion is shown in the accompanying drawings in which:

Fig. 1 shows a plan of a tape recorder to which this apparatus is attached.

Fig. 2 shows a longitudinal section of Fig. 3 on the line A—A.

Fig. 3 shows a plan of the measuring meter of this apparatus.

On the right and left of the upper part of the recorder, the winding reel 2 and rewinding reel 3 are fitted on to the shafts 4, 5 respectively. The shaft 5 is set free while the shaft 4 is caused to rotate sufficiently to wind the amount of the tape 6 that is desired for recording and reproduction. The tape wound on the rewinding reel will be reeled on the reel 2 passing around the roller 7, the guide roller 8, the head-casing 9 and the winding roller 10; the roller 7 is desirably removably supported on its shaft 11 so that rollers of different diameter can be used to give direct time readings in correspondence with different tape speeds.

The shaft 11 of the roller 7 is extended downward and it is keyed to the small toothed wheel 13 in the casing 12. The said wheel transmits the motion of the roller 7—that is the motion of the tape, to the central shaft 14 through the clock mechanism of gear train, and the second-hand 15 is fixed to the top of the central shaft 14. To the upper end of the hollow shaft 16 in which the shaft of the second-hand is placed, the minute-hand 17 is fixed.

When the roller 7 rotates and the tape advances 3¾", the second-hand 15 advances one graduation. When the minute hand rotates once, the hour-hand 18 advances one graduation. If the hands are desired to be set at 0 or any other positions, it can be done by winding the stem 19. A friction spring 21 is provided in order to normally maintain the gear on the stem 19 out of engagement with the rest of the gear train. Thus, when the knurled head on that stem is held by the fingers, no motion of the pointers in either direction is imparted until the spring 21 is compressed by pushing down on the stem to engage the gears. When such engagement is effected, however, turning of the knurled head on the stem in desired direction will actuate the gear train and cause the pointers to be set at zero, or at the position desired. As the friction spring 21 constantly urges the gear on stem 19 upwardly, rotation of the stem 19 without depression does not hinder the operation of the pointers. Unless the contact of the roller and tape is perfect, the motion of the tape can never be transmitted satisfactorily to the roller 7, so the rollers 20 are installed on both sides of the roller 7, and one of the rollers 20 is a press roller. But both of the rollers could be press rollers.

Since this apparatus is constructed as above stated, when the tape is reeled 3¾"/sec., the second-hand advances one graduation. Therefore by reading the position of hands the time required for the tape to pass through the head-casing can directly be obtained and indirectly the length of the tape advanced can also be obtained. In editing unnecessary parts can be easily cut off and necessary parts can be put together by measuring the length of the tape or by timing.

Formerly it has been required to hear all parts in editing and when an unnecessary part was reached, it was erased or cut off, but by this apparatus the editing is made much easier and more convenient.

I claim:

1. The combination with magnetic tape recording and reproducing apparatus having means for transporting said tape, of measuring apparatus comprising a roller adapted to engage the said tape, means to place said tape in tension and to hold said tape in firm frictional engagement with a portion of the periphery of said roller, a shaft for removably supporting said roller, indicating pointers, a reduction gear train coupling said shaft and said indicating pointers, and means associated with said indicating pointers for manually actuating one or more of them whereby said indicating pointers denote the movement of said tape and may be readily coordinated with different tape speeds to produce an indication directly coordinated with said tape movement.

2. In a recording and reproducing machine employing a recording tape, an apparatus that indicates by means of pointers a portion of the tape that is desired to be recorded, reproduced or erased comprising a roller, a gear train for operating said pointers, said gear train being driven directly by said tape which is in contact with the said roller, the number of revolutions of the said roller being transmitted by the said gear train to the said pointers, and means manually operating the said pointers, whereby a predetermined portion of said tape can be directed indicated.

3. In a recording and reproducing machine employing a recording tape, a measuring apparatus for indicating the time during which said tape or portions thereof travel, comprising a roller adapted to engage the said tape, means to hold said tape in firm frictional engagement with a portion of the periphery of said roller, a gear train driven by said roller, pointers indicating revolutions of said roller in time and length and means manually operating the said pointers, whereby the time for recording, reproducing and erasing records on said tape or portions thereof can be read directly to the second.

References Cited in the file of this patent

UNITED STATES PATENTS

| | | |
|---|---|---|
| Re. 22,970 | Begun | Feb. 10, 1948 |
| 1,237,496 | Fankhauser et al. | Aug. 21, 1917 |
| 1,478,910 | Perkins | Dec. 25, 1923 |
| 1,589,184 | Levy | June 15, 1926 |
| 2,048,488 | Begun | July 21, 1936 |
| 2,480,742 | Kent | Aug. 30, 1949 |
| 2,632,060 | Foote et al. | Mar. 17, 1953 |
| 2,652,630 | Niland | Sept. 22, 1953 |
| 2,656,756 | Birr et al. | Oct. 27, 1953 |